United States Patent [19]

Yamada

[11] Patent Number: 4,752,687
[45] Date of Patent: Jun. 21, 1988

[54] RADIATION IMAGE ERASE UNIT FOR USE WITH STIMULABLE PYHOSPHOR SHEET

[75] Inventor: Sadami Yamada, Kanagawa, Japan

[73] Assignee: Fuji Photo Film Co., Ltd., Kanagawa, Japan

[21] Appl. No.: 847,781

[22] Filed: Apr. 2, 1986

[30] Foreign Application Priority Data

Apr. 3, 1985 [JP] Japan .................................. 60-70704

[51] Int. Cl.$^4$ ................................................ G01T 1/10
[52] U.S. Cl. ............................. 250/327.2; 250/484.1
[58] Field of Search ................ 193/41, 38; 198/860.3, 198/721, 735, 722; 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,371,156 | 2/1983 | Pessina et al. | 270/54 |
| 4,387,428 | 6/1983 | Ishida et al. | 364/414 |
| 4,400,619 | 8/1983 | Kotera et al. | 250/327.2 |
| 4,496,838 | 1/1985 | Umemoto et al. | 250/327.2 |
| 4,648,590 | 3/1987 | Paulat | 271/272 |

FOREIGN PATENT DOCUMENTS 11395  2/1981  Japan ................................. 250/327.2

*Primary Examiner*—Janice A. Howell
*Assistant Examiner*—Constantine Hannaher
*Attorney, Agent, or Firm*—Sughrue, Mion, Zinn, Macpeak & Seas

[57] ABSTRACT

A radiation image erase unit for erasing a remaining radiation image from a stimulable phosphor sheet includes a box-shaped casing housing erase light sources therein and having a slot for passage therethrough of the stimulable phosphor sheet into and out of the casing, and feeders mounted on the casing for delivering the stimulable phosphor sheet into the casing, positioning the stimulable phosphor sheet in a prescribed position in the casing, and delivering the stimulable phosphor sheet from the prescribed position out of the casing. A guide member having as small an area as possible for contact with the stimulable phosphor sheet is disposed in the casing. The casing has a wall spaced from the guide member and extending in confronting relation to the erase light source. When the stimulable phosphor sheet is discharged out of the casing, the wall is exposed directly to light emitted from the erase light sources which remain energized during operation of the radiation image erase unit. In operation, the stimulable phosphor sheet is sufficiently exposed to the erasure light from the erase light sources in the casing to get a remaining radiation image erased therefrom. The stimulable phosphor sheet is not adversely affected by heat radiation from the wall of the casing to guard against heat-induced damage. Therefore, radiation images can be recorded on the stimulable phosphor sheet recyclically for a long period of time.

10 Claims, 8 Drawing Sheets

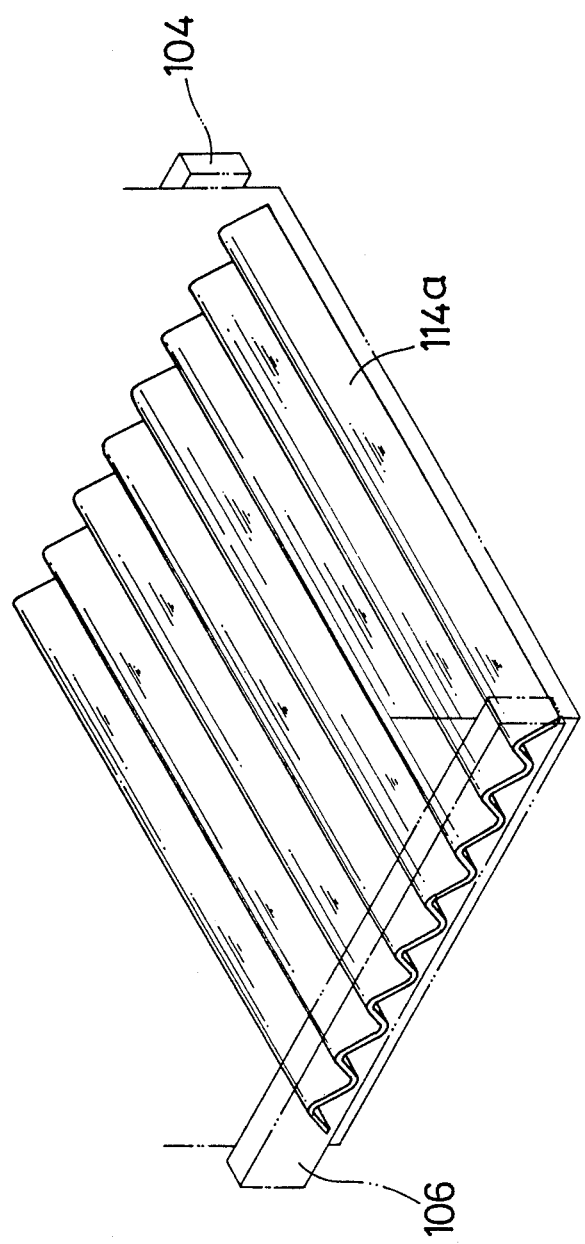

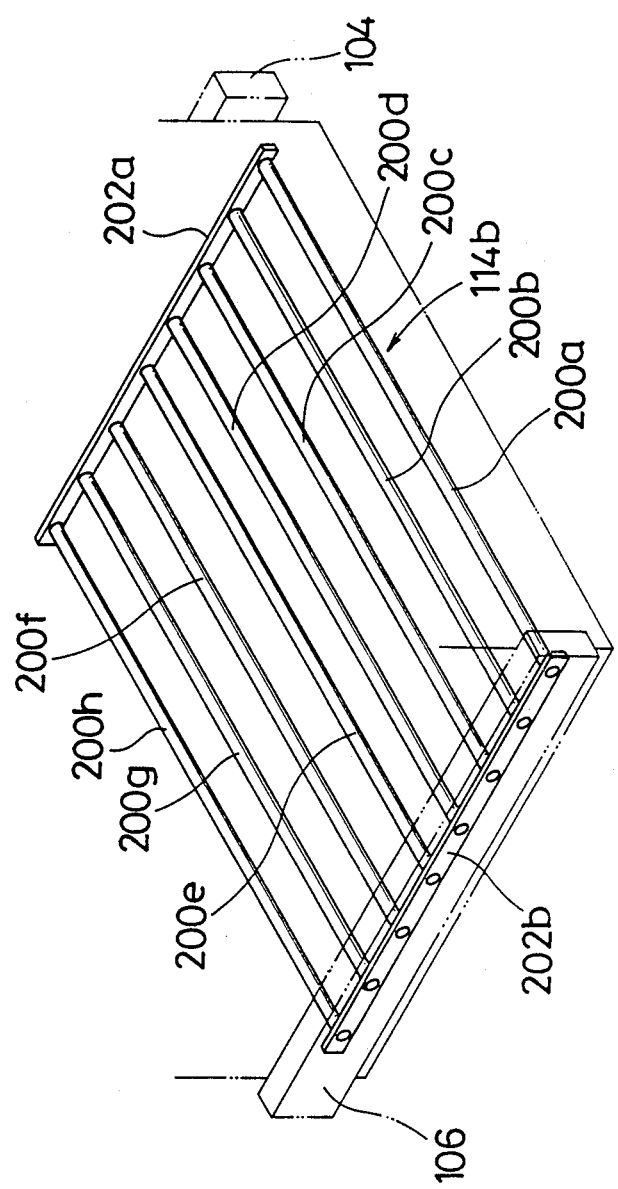

RADIATION IMAGE ERASE UNIT FOR USE WITH STIMULABLE PYHOSPHOR SHEET

BACKGROUND OF THE INVENTION

The present invention relates to a radiation image erase unit, and more particularly to a radiation image erase unit for erasing remaining radiation image from a stimulable phosphor sheet by exposing the stimulable phosphor sheet to erasing light emitted from an erase light source housed in the casing of the image erase unit, the radiation image erase unit being arranged to prevent the erasing light from heating at least a portion of the wall of the casing and also to prevent the stimulable phosphor sheet in an image-erasable condition from being damaged by heat radiation from the casing wall.

There has in recent years been proposed a radiation image recording and reproducing system in which a radiation image of an object can be produced by using a stimulable phosphor. The stimulable phosphor is a phosphor which, when exposed to a radiation such as X-rays, α-rays, β-rays, γ-rays, cathode ray, or ultraviolet rays, stores a part of the energy of the radiation. When the stimulable phosphor exposed to the radiation is subsequently exposed to stimulating light such as visible light, the stimulable phosphor emits light in proportion to the stored energy of the radiation.

The radiation image recording and reproducing system employs such a stimulable phosphor. More specifically, the radiation image of an object such as a human body is stored in a sheet having a layer of stimulable phosphor (hereinafter referred to as a "stimulable phosphor sheet" or a "phosphor sheet"), and then the stimulable phosphor sheet is scanned with stimulating light such as a laser beam to cause the stimulable phosphor sheet to emit light representative of the radiation image. The emitted light is then photoelectrically detected and converted to an electric image signal which is processed to reproduce a visible image on a recording medium such as a photographic film material or on a display unit such as a cathode ray tube (CRT).

The aforesaid radiation image recording and reproducing system is disclosed in U.S. Pat. Nos. 4,258,264, 4,276,473, 4,315,318, 4,387,428, and Japanese Laid-Open Patent Publication. No. 56-11395, for example.

The radiation image recording and reproducing system of the type described above is of greater practical advantage than conventional radiographic systems using a combination of an intensifying screen and an X-ray film in that images can be recorded in a wide range of radiation exposure. More specifically, it is known that the amount of light emitted from a stimulable phosphor upon stimulation thereof is proportional in a highly wide range to the amount of radiation to which the stimulable phosphor has been exposed. Therefore, even if the amount of radiation to which the stimulable phosphor is exposed varies widely under various conditions, radiation images free from such exposure variations can be obtained by selecting a suitable read-out gain in the photoelectric conversion means for detecting and converting the emitted light into an electric signal, and processing the electric signal into a visible image on a recording medium such as photosensitive material or on a display unit such as a CRT.

The radiation image recording and reproducing system is capable of processing a converted electric signal to produce a visible image on a recording medium or a display unit so that the radiation image can well be observed for diagnostic purpose. In this system, the stimulable phosphor sheet does not serve as a final image recording medium, but as a temporary image storage medium for eventually transferring images to the final recording medium or display unit. Therefore, the stimulable phosphor sheet can be used repeatedly or recyclically, and is economical and convenient if in repetitive use.

To reuse the stimulable phosphor sheet, the remaining radiation energy on the stimulable phosphor sheet after the radiation image has been read out by stimulating light is discharged by exposure to light, and the stimulable phosphor sheet is employed again for recording a radiation image thereon. The erasure of the radiation energy from the stimulable phosphor sheet is disclosed in U.S. Pat. No. 4,400,619, for example.

An image erase mechanism for removing the remaining radiation image from the stimulable phosphor sheet after the desired image has been read therefrom should preferably be assembled as a unit in the radiation image read-out apparatus. To allow the image erase mechanism to be easily assembled in the apparatus, the overall apparatus is required to be compact and so is the image erase mechanism. The applicant has already proposed a box-shaped image erase unit as a compact image erase mechanism for use with stimulable phosphor sheets, the image erase unit comprising a casing accommodating erase light sources and a feed means disposed within or without the casing for delivering stimulable phosphor sheets to a desired position (see Japanese Patent Application Nos. 59-112532, 59-112533, and 59-112534).

In the box-type image erase mechanism which is required to be compact in size, the erase light sources and the wall of the casing are disposed quite closely to each other. As a result, the casing wall is heated by the heat radiated from the erase light sources to adversely affect the stimulable phosphor sheet in the casing. The erase light sources are capable of irradiating the stimulable phosphor sheet with a high illuminance for substantially thoroughly discharging any remaining radiation energy from the sheet. In order to erase the remaining image completely and in a short time from the phosphor sheet with the erasure light, an increased number of erase light sources and an increased amount of erasure light should be employed to generate intensive erasure light. The increased number of erase light sources and the increased amount of erasure light, however, tend to heat the image erase mechansim excessively, resulting in damage to the image erase mechanism, the sheet, and the surrounding components.

As disclosed in Japanese Laid-Open Patent Publication No. 55-146447, the stimulable phosphor sheet comprises a support made of paper or a high polymeric organic material such as polyethylene terephthalate, and a phosphor layer deposited on the support. The phosphor layer is composed of a binder made of high polymeric organic material such as nitrocellulose, and stimulable phosphor particles dispersed in the binder. A transparent protective layer is deposited on the surface of the phosphor layer which is opposite to the support for physically or chemically protecting the phosphor layer. The protective layer is also made of a high polymeric organic material such as polyethylene terephthalate. Since the stimulable phosphor sheet is composed of organic materials that are easily susceptible to thermally induced deformation and/or property modification, the stimulable phosphor sheet, when subjected to excess heat from the erase light sources or the casing wall heated by the erase light sources, is apt to be deformed and/or modified. Thus, the sheet may not be reused smoothly, or cannot entirely be reused.

The casing of the box-type image erase mechanism is substantially fully closed except for inlet and outlet openings for stimulable phosphor sheets. Therefore, the wall of the casing is unduly heated by erasure light, except where the inner casing wall surface has a mirror finish for effectively reflecting the erasure light to the stimulable phosphor sheet in the casing. The heat radiation from the casing wall is highly likely to heat and damage the stimulable phosphor sheet. The casing wall is heated directly by the erasure light especially when there is no stimulable phosphor sheet present in the casing.

SUMMARY OF THE INVENTION

It is a major object of the present invention to provide a radiation image erase unit for use with stimulable phosphor sheets which prevents a stimulable phosphor sheet from being heated and damaged by excessive heat radiation upon erasure of a remaining image therefrom, so that images can subsequently be recorded accurately and the sheets can be improved in durability.

Another object of the present invention is to provide a radiation image erase unit for erasing a remaining radiation image from a stimulable phosphor sheet by exposing the same to erasure light after reading out a radiation image stored therein by applying stimulating light to the stimulable phosphor sheet to cause the same to emit light representative of the radiation image and detecting and converting the light emitted from the stimulable phosphor sheet photoelectrically to an electric signal, the radiation image erase unit comprising: a casing housing erase light sources therein and having a wall disposed in confronting relation to the erase light sources and a slot positioned between the erase light sources and the wall for passage therethrough of the stimulable phosphor sheet into and out of the casing; feeder means mounted with respect to the casing for delivering the stimulable phosphor sheet into the casing, positioning the stimulable phosphor sheet in a prescribed position in the casing, and delivering the stimulable phosphor sheet from the prescribed position out of the casing, and a guide member disposed in the casing and extending along the wall for guiding the stimulable phosphor sheet in substantially line-to-line contact therewith as it is delivered into and out of the casing through the slot by the feeder means.

The above and other objects, features and advantages of the present invention will become more appareht from the following description when taken in conjunction with the accompanying drawings in which preferred embodiments of the present invention are shown by way of illustrative example.

BRIEF DESCRIPTION OF THE DRAWINGS

FIGS. 7 and 8 are perspective views of guide members according to other embodiments of the present invention.

DETAILED DESCRIPTION OF THE PREFERRED EMBODIMENTS

Figure 1:
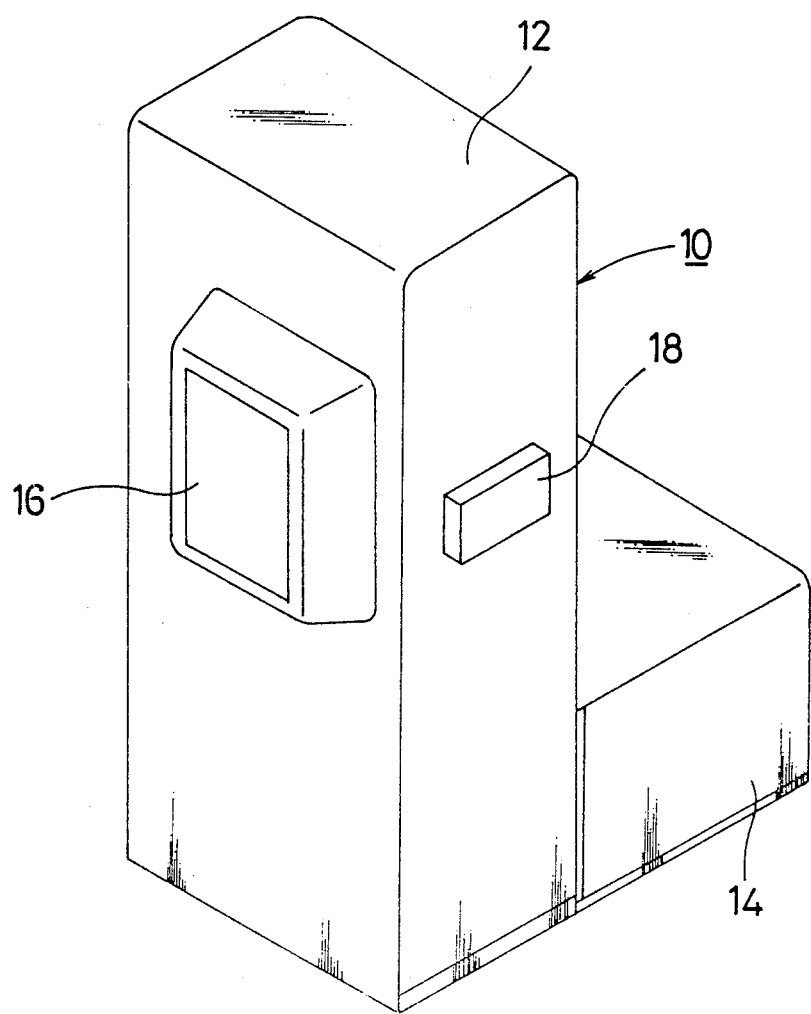
FIG. 1 is a perspective view of a radiation image recording and read-out apparatus.

As shown in FIG. 1, an upstanding radiation image recording and read-out apparatus 10 includes a first vertical housing 12 and a second horizontal housing 14. The first housing 12 supports an exposure unit (radiation image recording unit) 16 on a front upper portion thereof and a control unit 18 on a side upper wall thereof.

Figure 2:
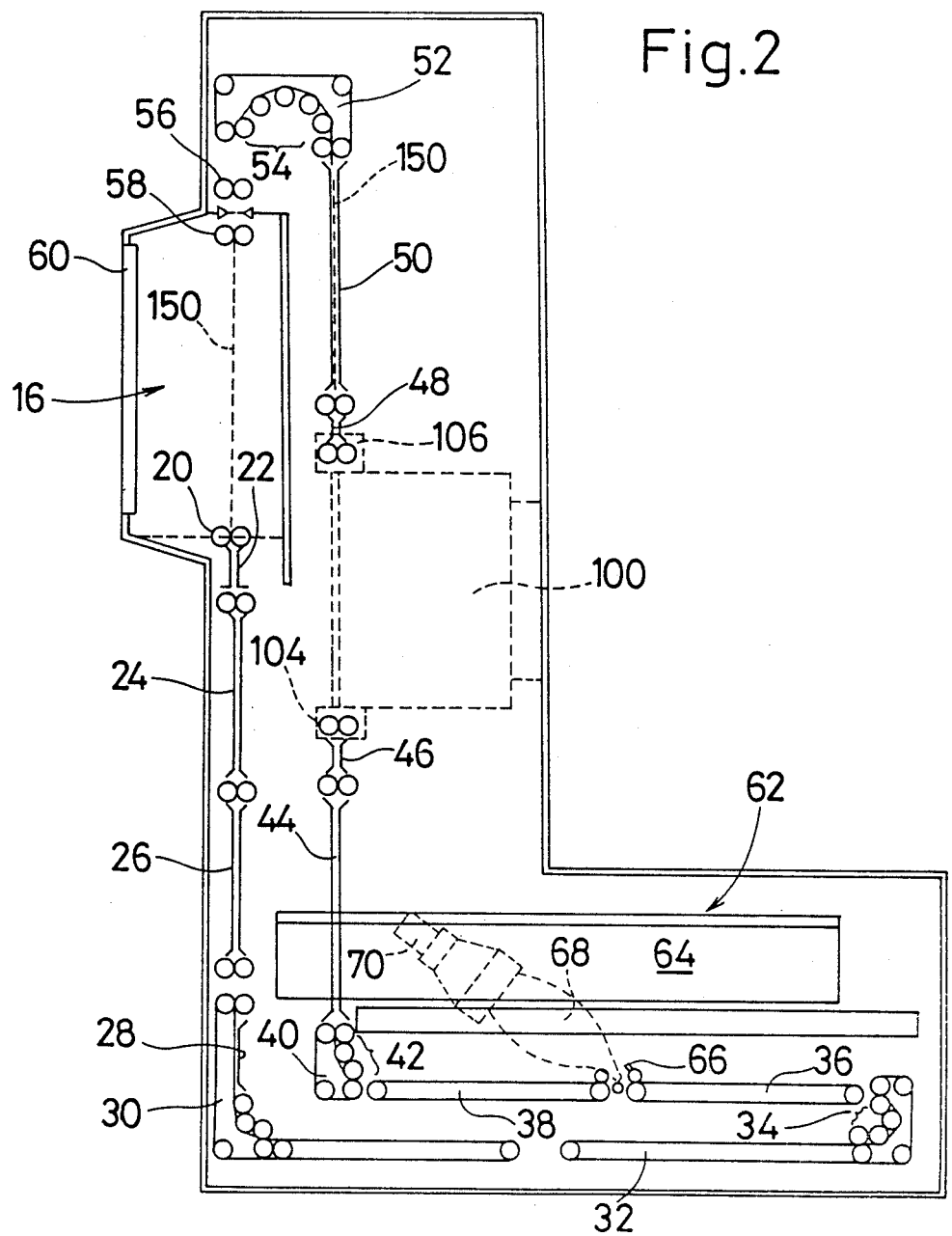
FIG. 2 is a vertical cross-sectional view of the radiation image recording and read-out apparatus of FIG. 1.

The arrangements in the first and second housings 12, 14 will be described with reference to FIG. 2.

A pair of sheet reception rollers 20 for receiving a stimulable phosphor sheet on which an image is recorded is disposed in a lower portion of the image recording unit 16. Below the roller pair 20, there are disposed a first guide member 22 and a second guide member 24 extending in the vertical direction in alignment with the first guide member 22. Third guide members 26 and a fourth guide member 28 are located beneath the first and second guide members 22, 24 with a roller pair disposed therebetween, there being also a roller pair between the third and fourth guide members 26, 28. A first endless feed belt 30 is disposed closely to the fourth guide member 28 and has an angularly bent configuration at an inner corner of the first housing 12, the bent configuration of the first endless feed belt 30 being kept by a roller group below the fourth guide member 28. The first feed belt 30 terminates at a lower central portion of the second housing 14. A second endless feed belt 32 is disposed in a slightly spaced relation to the terminal end of the first endless feed belt 30. The second endless feed belt 32 is angularly bent in an upward direction at an inner corner of the second housing 14. A group of rollers 34 is held against the inner bent portion of the second feed belt 32. A pair of third and fourth endless feed belts 36, 38 extends horizontally in slightly spaced relation to the terminal end of the feed belt 32. A fifth endless belt 40 bent upwardly is located in the vicinity of the terminal end of the fourth feed belt 38. A group of rollers 42 is held against a surface of the belt 40. The fifth belt 40 and the roller group 42 are located beneath a pair of guide members 44 disposed below a pair of guide members 46 with a pair of rollers interposed therebetween. Above the guide members 46, there is positioned a radiation image erase unit (described later on) according to the present invention.

Relatively short guide members 48 are disposed above the radiation image erase unit, and other guide members 50 are located above the guide members 48. An endless feed belt 52 of a bent configuration is disposed in the vicinity of the terminal ends of the guide members 50 in a substantially top portion of the first housing 12 as can be understood from FIG. 2. A roller group 54 is held against an inner run of the feed belt 52. Below the terminal ends of the feed belt 52 and the roller group 54, there are disposed two pairs of rollers 56, 58 for supplying a stimulable phosphor sheet into the image recording unit 16.

The feed system for a stimulable phosphor sheet has the above basic construction in the radiation image recording and read-out system 10.

The image read-out unit disposed in the radiation image recording and read-out apparatus 10 in association with the feed system will be described.

The image read-out unit, designated 62, is basically composed of a laser beam source 64, a scanning optical system including a galvanometer mirror (not shown) for scanning a laser beam emitted from the laser beam source 64 over a stimulable phosphor sheet, a reflecting mirror 66 for collecting light, and a light collecting optical element or light guide 68 for effectively collecting and guiding light emitted from the stimulable phosphor sheet by the scanning laser beam. A photomultiplier 70 is mounted on the top of the light guide 68 to detect the emitted light and to convert it to an electric signal.

The radiation image erase unit according to the present invention is in shown FIGS. 3 through 6.

The radiation image erase unit for the stimulable phosphor sheet is essentially in the form of a box having erase light sources disposed therein.

Figure 3:
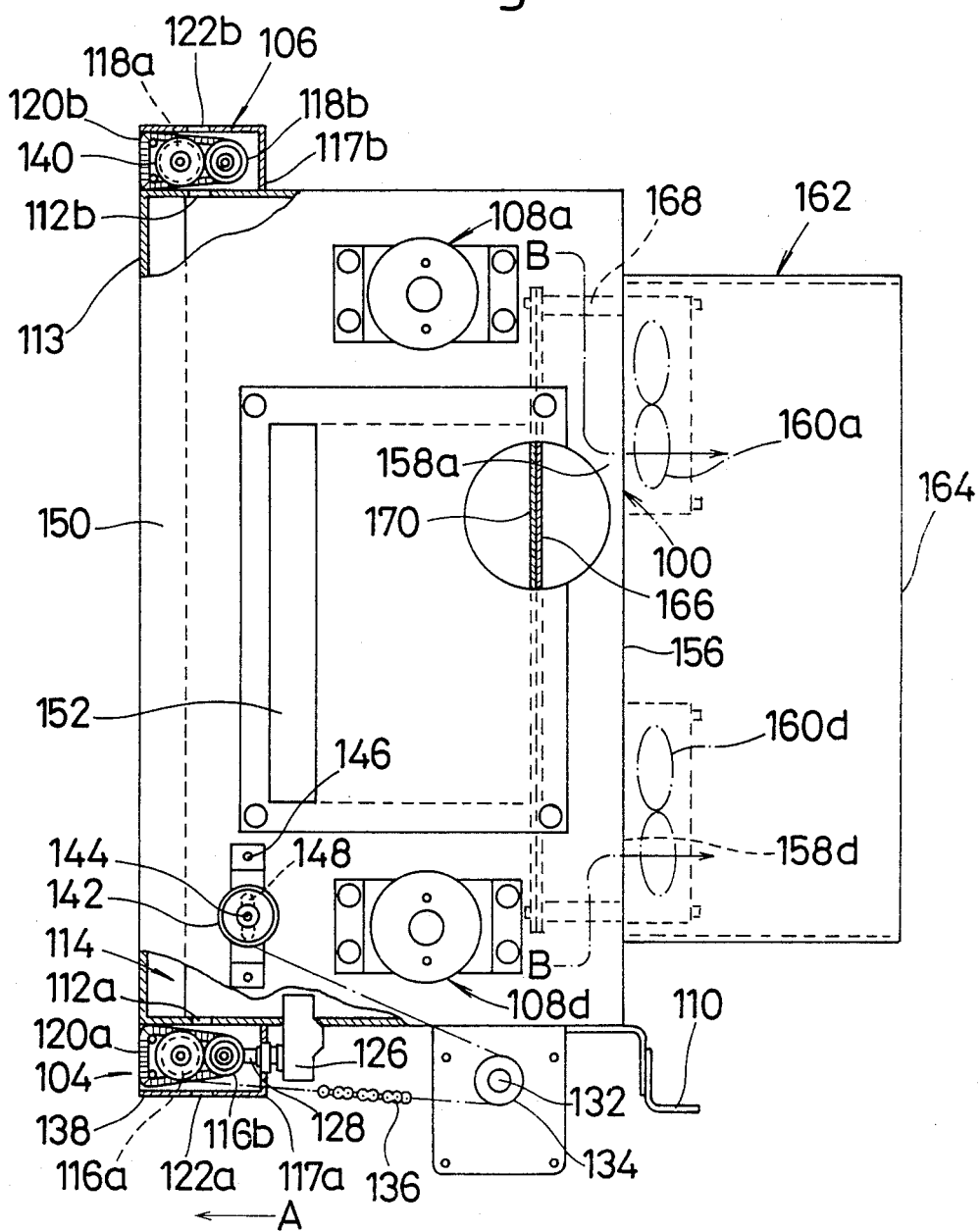
FIG. 3 is a vertically sectional front elevational view of a radiation image erase unit for use with stimulable phosphor sheets according to an embodiment of the present invention.

The reference numeral 100 in FIG. 3 denotes the radiation image erase unit for stimulable phosphor sheets. The radiation image erase unit 100 essentially comprises a casing 102, a pair of feeders 104, 106 mounted on the lower and upper ends, respectively, of the casing 102, and four light sources 108a through 108d for emitting erasure light into the casing 102. The inner wall surface of the casing 102 is of a mirror finish, or a reflecting thin film or plate is attached to the inner wall surface of the casing 102, for effectively reflecting the erasure light from the light sources 108a through 108d. An angle 110 is fixed to the lower end of the casing 102. The casing 102 can be fixed to the first housing 12 by attaching the angle 110 to the first housing 12.

Figure 4:
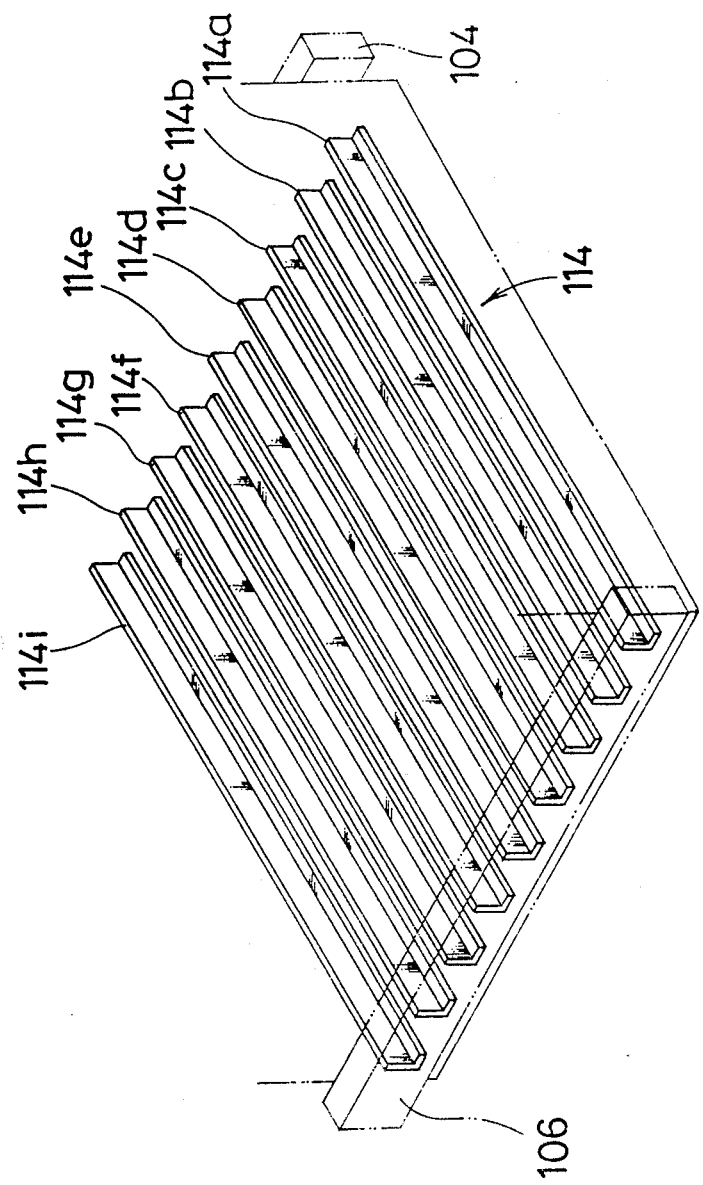
FIG. 4 is a perspective view of a guide member incorporated in the radiation image erase unit shown in FIG. 3.
Figure 5:
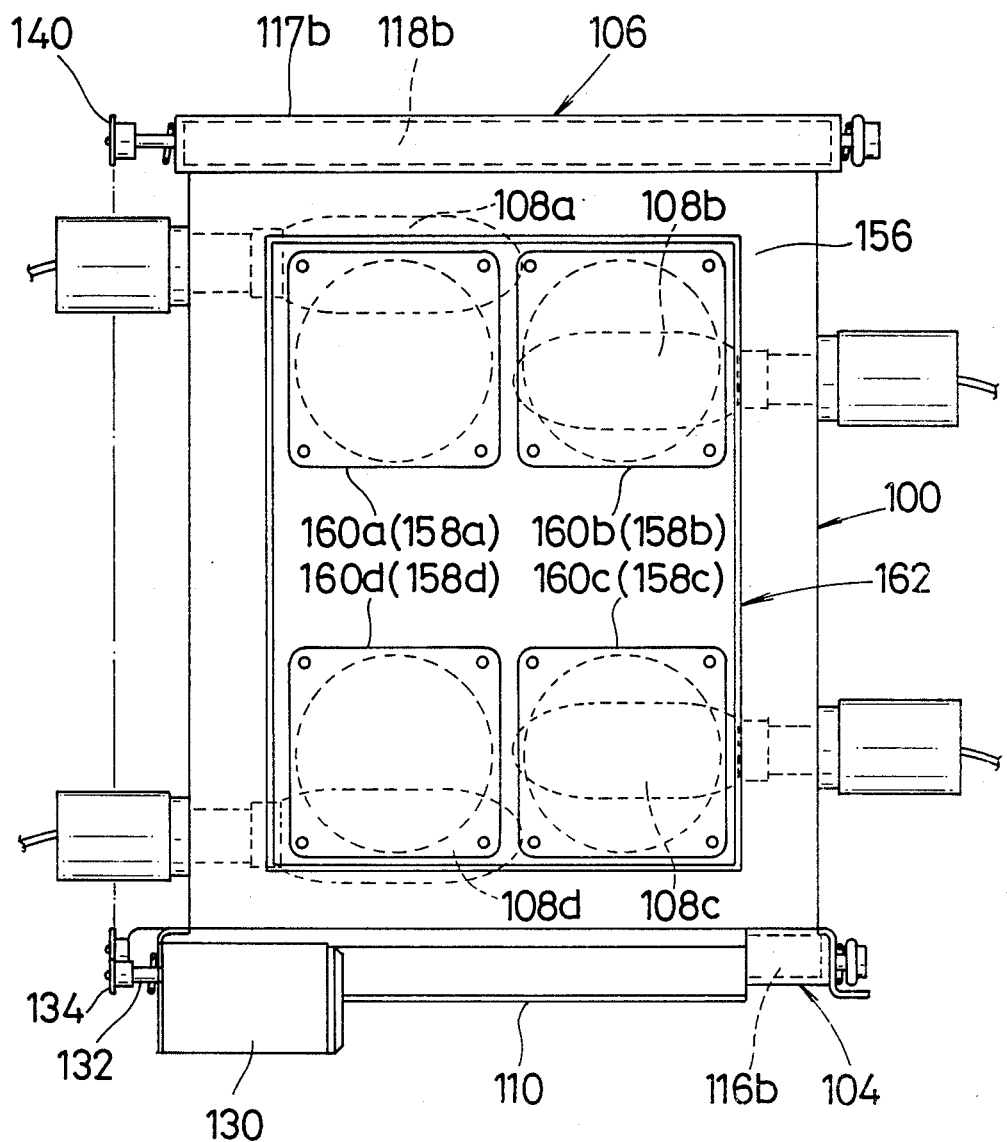
FIG. 5 is a side elevational view of the radiation image erase unit of FIG. 3.

The casing 102 has inlet and outlet slots 112a, 112b defined in upper and lower panels thereof adjacent to the feeders 104, 106, respectively. A guide member 114 is disposed closely to the inlet and outlet slots 112a, 112b for guiding a stimulable phosphor sheet from the inlet slot 112a to the outlet slot 112b, the guide member 114 being secured to a side wall 113 of the casing 102 opposite to the light sources 108a through 108d. As shown in FIG. 4, the guide member 114 comprises a plurality of angle members 114a through 114i each of a substantially L-shaped cross section, the angle members 114a through 114i extending longitudinally from the inlet slot 112a toward the outlet slot 112b. The angle members 114a through 114i may be made of metal or may be molded of thermally resistant synthetic resin, and have erected longitudinal edges finished smoothly to prevent the stimulable phosphor sheet from being damaged as it is fed therealong.

The feeder 104 is composed of a pair of nip rollers 116a, 116b held in rolling contact with each other and enclosed in a first cover 117a outwardly of the slot 112a. Likewise, the feeder 106 is composed of a pair of nip rollers 118a, 118b held in rolling contact with each other and enclosed in a second cover 117b at the slot 112b. Resilient members 120a, 120b such as coil springs are attached to the covers 117a, 117b, respectively, and held in engagement with the nip rollers 116b, 118b for normally urging them to be forcibly pressed against the nip rollers 116a, 118a, respectively. The covers 117a, 117b which surround the respective feeders 104, 106 thus constructed have slots 122a, 122b, respectively, aligned with the inlet and outlet slots 112a, 112b, respectively.

A detecting arm 128 of a microswitch 126 is disposed in contact with the nip roller 116b. A motor 130 is fixed to the casing 102 closely to the angle 110 and has a rotatable shaft 132 to which a first sprocket 134 is fixed. A chain 136 is trained around the first sprocket 134, a second sprocket 138 fixed coaxially to the nip roller 116a, and a third sprocket 140 disposed in an upper position and fixed coaxially to the nip roller 118a. The chain 136 is also trained around a fourth tensioning sprocket 142 mounted on the side panel of the casing 102.

The fourth sprocket 142 is supported on a shaft 144 displaceable in a slot 148 defined in a holder 146 attached to the casing 102 for giving the chain 136 an optimum tension.

Figure 6:
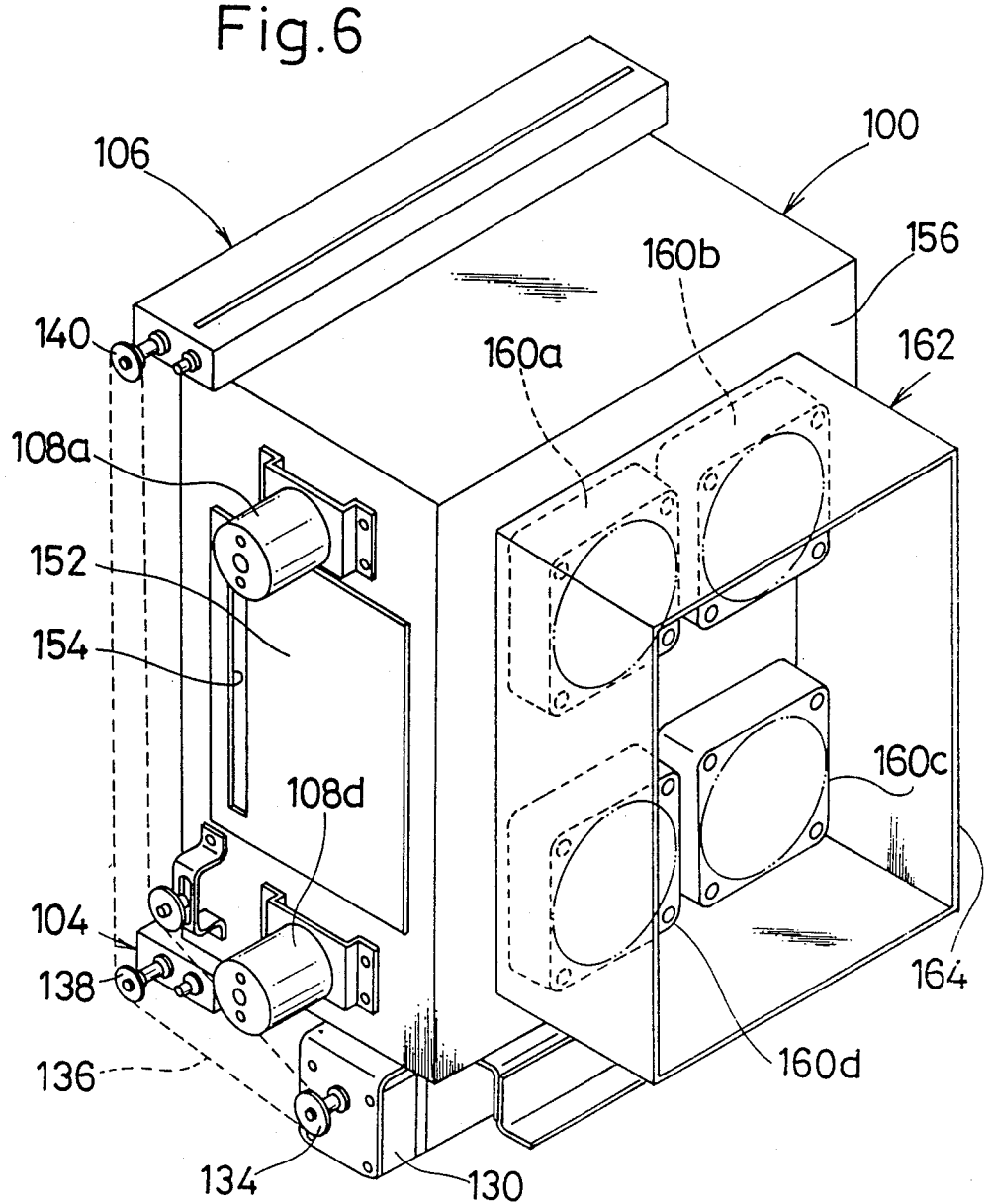
FIG. 6 is a perspective view of the radiation image erase unit of FIG. 3.

The radiation image erase unit 100 includes a heat radiator for forcibly cooling the casing 102. As shown in FIG. 6, the heat radiator is composed of a relatively small opening 154 defined in a front wall 152 of the casing 102, a plurality of openings 158a through 158d (four openings in the illustrated embodiment) defined in a side panel 156 of the casing 102 and each larger than the opening 154, and a plurality of motor-driven fans 160a through 160d (four motor-driven fans in the illustrated embodiment) disposed respectively in the openings 158a 158d and drivable in synchronism with energization of the light sources 108a through 108d. A duct 162 of a rectangular cross section is mounted on the side panel 156 in surrounding relation to the openings 158a through 158d and hence the motor-driven fans 160a through 160d. The duct 162 has an opening 164 at its distal end extending through the first housing 12, the opening 164 communicating with the exterior of the radiation image recording and read-out apparatus 10 (FIGS. 1 and 2).

A reflecting plate 166 smaller in area than the side panel 156 is disposed in the casing 102 and mounted on the side panel 156 by bolts 168 threaded at both ends thereof or other fasteners, the reflecting plate 166 being spaced from the inner surface of the side panel 156. The reflecting plate 166 is positioned as closely to the light sources 108a through 108d as possible, and has a surface 170 of a mirror finish which faces the light surfaces 108a through 108d. Alternatively, the surface of the reflecting plate 166 facing the light sources 108a through 108d may be coated with a thin reflecting film or provided with a thin reflecting plate.

Operation and advantages of the radiation image erase unit thus constructed will be described below.

An object (not shown) held against an exposure surface 60 of the image recording unit 16 is exposed to radiation, and a radiation image of the object is recorded on a stimulable phosphor sheet 150. The stimulable phosphor sheet 150 is then fed through the rollers 20, the guide members 24, 26, and the feed belts 30, 32, 36 to the image read-out unit 62. In the image read-out unit 62, the stimulable phosphor sheet 150 is scanned by a laser beam emitted from the laser source 64 to emit light which is reflected directly or by the mirror 66 to the light guide 68. The light from the light guide 68 is then detected and photoelectrically converted by the photomultiplier 70 to an electric signal that is fed to an image reproducing unit (not shown).

After the radiation image has been read from the stimulable phosphor sheet 150, the stimulable phosphor sheet 150 is fed by the feed belts 38, 40 through the guide members 44 and the guide members 46 to the nip rollers 116a, 116b. The stimulable phosphor sheet 150 as introduced into the inlet slot 122a is led by the nip rollers 116a, 116b into the casing 102. When the stimulable phosphor sheet 150 is pinched between the nip rollers 116a, 116b, the nip roller 116b is displaced by the sheet 150 away from the nip roller 116a against the tension of the coil spring 120a to push the detecting arm 128 of the microswitch 126. The microswitch 126 then generates a signal to energize the motor 130, whereupon the chain 136 is moved to rotate the second sprocket 138. Since the second sprocket 138 is fixed coaxially to the nip roller 116a, the nip roller 116a is rotated to deliver the stimulable phosphor sheet 150 upwardly. Thus, as described above, the microswitch 126 is turned on to energize the motor 130 when the stimulable phosphor sheet 150 reaches the nip roller 116b and displaces the same.

While the stimulable phosphor sheet 150 is being introduced through the inlet slot 112a into the casing 102 by being gripped between the nip rollers 116a, 116b, the light sources 108a, 108b, 108c, and 108d are energized to emit light at all times, and heated air in the casing 102 is discharged out of the casing 102 by the motor-driven fans 160a through 160d. The inner surface of the side wall 113 of the casing 102, which confronts the light sources 108a through 108d, is exposed to and heated by the light sources 108a through 108d, until the stimulable phosphor sheet 150 is fully introduced into the casing 102. The stimulable phosphor sheet 150 led into the casing 102 through the inlet slot 112a is spaced a substantial distance from the side wall 113 by the guide member 114. Therefore, the stimulable phosphor sheet 150 is prevented from directly contacting the side wall 113 that is heated. The temperature of the side wall 113 is prevented from being unduly increased as it is spaced a prescribed distance from the light sources 108a through 108d. As a consequence, the stimulable phosphor sheet 150 is not adversely affected by the heated side wall 113.

The light sources 108a through 108d remain energized irrespective of whether a stimulable phosphor sheet 150 is present in the casing 102 or not. Consequently, the light emitted from the light sources 108a through 108d is sufficiently reflected in the casing 102 before it is applied to the stimulable phosphor sheet 150. The remaining radiation image can therefore completely be erased from the stimulable phosphor sheet 150 in the casing 102. In synchronism with the energization of the light sources 108a through 108d, the motor-driven fans 160a through 160d are actuated to cause hot air heated by the light sources 108a through 108d in the casing 102 to flow in the direction of the arrow B (FIG. 3) into the duct 162 from which the hot air is discharged out of the erase unit 100. At the same time, cool air is introduced by the motor-driven fans 160a through 160d through the opening 154 into the casing 102 which is forcibly cooled by the introduced cool air.

After the remaining image has been erased from the stimulable phosphor sheet 150, the motor 130 is energized again to move the chain 136 to deliver the stimulable phosphor sheet 150 toward the guide members 48 while being pinched between the nip rollers 118a, 118b. Since any remaining radiation image has substantially completely been removed from the stimulable phosphor sheet 150 as it reaches the guide members 48, a next radiation image can be recorded on the stimulable phosphor sheet 150 without error after the sheet 150 has been fed into the image recording unit 16 through the feed belt 52 and the roller pairs 56, 58.

FIGS. 7 and 8 illustrate different guide members according to other embodiments of the present invention.

According to the embodiment of FIG. 7, a guide member 114a comprises a single corrugated sheet having parallel longitudinal ridges which have their ends positioned adjacent to the inlet and outlet ports 112a, 112b. In operation, the stimulable phosphor sheet 150 is guided from the inlet port 112a to the outlet port 112b while in contact with the ridges of the guide member 114a. Inasmuch as the ridges have round edges, they will not damage the surface of the stimulable phosphor sheet 150 which is held in contact with the ridges. The guide member 114a should preferably be molded of thermally resistant synthetic resin to simplify the manufacturing process as well as reduce the overall weight.

In the embodiment of FIG. 8, a guide member 114b comprises a pluarality of parallel spaced round rods 200a through 200h. The round rods 200a through 200h extend between and are retained at their opposite longitudinal ends by a pair of holders 202a, 202b attached to opposite side walls of the casing 102. The opposite longitudinal ends of the round rods 200a through 200h are positioned near the inlet and outlet slots 112a, 112b. When the stimulable phosphor sheet 150 goes into the casing 102 through the inlet slot 112a, the sheet 150 is delivered, in contact with peripheral surfaces of the round rods 200a through 200h, toward the outlet slot 112b. Even when the round rods 200a through 200h are heated by the erase light sources, the stimulable phosphor sheet 150 is prevented from being damaged by the heat since it is held in contact with only the peripheral surfaces of the round rods or line members which are closest to the light sources. That is, as in the embodiment of FIGS. 4 and 7, the stimulable phosphor sheet 150 is supported on a linear edge surface or peripheral portion of each line member of the guide member 114b, and the edge or peripheral poritons form lines which are spaced from on another by a predetermined distance so that the sheet is supported at points which form spaced lines.

With the arrangement of the present invention, a guide member for guiding a stimulable phosphor sheet is disposed in spaced relation to a casing wall which is subject to heating by erase light sources and which is in confronting relation to the erase light sources within a radiation image erase mechanism employed in a radiation image read-out apparatus. Therefore, the stimulable phosphor sheet is prevented by the guide member from being kept in direct contact with the heated casing wall, and the heat radiation applied by the heated casing wall to the stimulable phosphor sheet is reduced. As a result, the stimulable phosphor sheet is free from excessive ehating to guard against damage, so that it can record radiation images accurately and has an improved degree of durability. Since the guide member is simple in structure and inexpensive to manufacture, the cost of the entire image erase unit is not increased substantially. The guide member can be incorporated in existing image erase units.

The round rods 200a through 200h of the guide member 114b shown in FIG. 8 may comprise metal wires. The radiation image erase unit of the invention may be incorporated in a bed-type radiation image information recording and read-out apparatus in which an object lies horizontally when its radiation image is produced. The principles of the invention are also applicable to a radiation image erse unit or mechanism which has only one slot in its casing for both introducing a stimulable phosphor sheet to get a remaining radition image erased and discharging the stimulable phosphor sheet out of the casing after the image has been erased.

Although certain preferred embodiments have been shown and described, it should be understood that many changes and modifications may be made therein without departing from the scope of the appended claims.

What is claimed is:

1. A radiation image erase unit for erasing a remaining radiation image from a stimulable phosphor sheet by exposing said sheet to erasure light after reading out a radiation image stored therein by applying stimulating light to said stimulable phosphor sheet to cause said sheet to emit light representative of the radiation image and detecting and converting said light emitted from said stimulable phosphor sheet photoelectrically into an electric signal, said radiation image erase unit comprising: a casing housing erase light sources therein, said casing having a wall disposed in confronting relation to said erase light sources and a slot positioned between said erase lihgt sources and said wall for passage therethrough of said stimulable phosphor sheet into and out of said casing; feeder means mounted with respect to said casing for delivering said stimulable phosphor sheet into said casing, positioning said stimulable phosphor sheet in a prescribed position in said casing, and delivering said stimulable phosphor sheet from said prescribed position out of said casing, and guide means, disposed in said casing and extending along said wall and including at least one line member having a substantially linear edge portion, for guiding said stimulable phosphor sheet and supporting a surface of said sheet along said linear edge portion as said sheet is delivered into and out of said casing through said slot by said feeder means.

2. A radiation image erase unit according to claim 1, wherein said casing has an inner wall surface which is at least partly of a mirror finish.

3. A radiation image erase unit according to claim 1, including a reflecting thin film or plate attached to a portion of an inner wall surface of said casing.

4. A radiation image erase unit according to claim 1, including motor-driven fans mounted in heat radiation openings, respectively, defined in a side wall of said casing, and a reflecting plate disposed between said motor-driven fans and said erase light sources in confronting relation to said heat radiation openings.

5. A radiation image erase unit according to claim 4, wherein said reflecting plate has a surface of a mirror finish which faces said erase light sources.

6. A radiation image erase unit according to claim 4, wherien said reflecting plate has a surface facing said erase light sources with a reflecting thin film or plate attached to said surface.

7. A radiation image erase unit for erasing a remaining radiation image from a stimulable phosphor sheet by exposing said sheet to erasure light after reading out a radiation image stored therein by appling stimulating light to said stimulable phosphor sheet to cause said sheet to emit light representative of the radiation image and detecting and converting said light emitted from said stimulable phosphor sheet photoelectrically into an electric signal, said radiation image erase unit comprising: a casing housing erase light soruces therein, said casing having a wall disposed in confronting relation to said erase light sources and a slot positioned between said erase light sources and said wall for passage therethrough of said stimulable phosphor sheet into and out of said casing; feeder means mounted with respect to said casing for delivering said stimulable phospor sheet into said casing, positioning said stimulable phosphor sheet in a prescribed position in said casing, and delivering said stimulable phospher sheet from said prescribed position out of said casing, and guide means, disposed in said casing and extending along said wall and including a plurality of line member having respective substantially linear edge portions, for guiding said stimulable phosphor sheet and supporting a surface of said sheet along said linear edge portions as said sheet is delivered into and out of said casing through said slot by said feeder means, wherein said line members are formed by angle members fixed to said wall of the casing and having as said linear edge portions, respective longitudinal parallel erected edges extending in the direction in which said stimulable phosphor sheet is delivered in said casing.

8. A radiation image erase unit for erasing a remaining radiation image from a stimulable phosphor sheet by exposing said sheet to erasure light after reading out a radiation image stored therein by applying stimulating light to said stimulable phosphor sheet to cause said sheet to emit light representative of the radiation image and detecting and converting said light emitted from said stimulable phosphor sheet photoelectrically into an electric signal, said radiation image erase unit comprising: a casing housing erase light sources therein, said casing having a wall disposed in confronting relation to said erase light sources and a slot positioned between said erase light sources and said wall for passage therethrough of said stimulable phosphor sheet into and out of said casing; feeder means mounted with respect to said casing for delivering said stimulable phosphor sheet into said casing, positioning said stimulable phosphor sheet in a prescribed position in said casing, and delivering said stimulable phosphor sheet from said prescribed position out of said casing, and guide means, disposed in said casing and extending along said wall and including a plurality of line members having respective substantially linear edge portions, for guiding said stimulable phosphor sheet and supporting a surface of said sheet along said linear edge portions as said sheet is delivered into and out of said casing through said slot by said feeder means, wherein said guide means comprises a sheet having as said respective linear edge portions of said line members a plurality of parallel ridges extending in the direction in which said stimulable phosphor sheet is delivered in said casing.

9. A radiation image erase unit for erasing a remaining radiation image from a stimulable phosphor sheet by exposing said sheet to erasure light after reading out a radiation image stored therein by applying stimulating light to said stimulable phosphor sheet to cause said sheet to emit light representative of the radiation image and detecting and converting said light emitted from said stimulable phosphor sheet photoelectrically into an electric signal, said radiation image erase unit comprising: a casing housing erase light sources therein, said casing having a wall disposed in confronting relation to said erase light sources and a slot positioned between said erase light sources and said wall for passage therethrough of said stimulable phosphor sheet into and out of said casing; feeder means mounted with respect to said casing for delivering said stimulable phosphor sheet into said casing, positioning said stimulable phosphor sheet in a prescribed position in said casing, and delivering said stimulable phosphor sheet from said prescribed position out of said casing, and guide means, disposed in said casing and extending along said wall and including a plurality of line members having respective substantially linear edge portions, for guiding said stimulable phosphor sheet and supporting a surface of said sheet along said linear edge portions as said sheet is delivered into and out of said casing through said slot by said feeder means, wherein said line members comprise parallel spaced round rods extending in the direction in which said stimulable phospohor sheet is delivered in said casing.

10. A radiation image erase unit for erasing a remaining radiation image from a stimulable phosphor sheet by exposing said sheet to erasure light after reading out a radiation image stored therein by applying stimulating light to said stimulable phosphor sheet to cause said sheet to emit light representative of the radiation image and detecting and converting said light emitted from said stimulable phosphor sheet photoelectrically into an electric signal, said radiation image erase unit comprising: a casing housing erase light sources therein, said casing having a wall disposed in confronting relation to said erase light sources and a slot positioned between said erase light sources and said wall for passage therethrough of said stimulable phosphor sheet into and out of said casing; feeder means mounted with respect to said casing for delivering said stimulable phosphor sheet into said casing, positioning said stimulable phosphor sheet in a prescribed position in said casing, and delivering said stimulable phospor sheet from said prescribed position out of said casing, and guide means, disposed in said casing and extending along said wall and including a plurality of line members having respective substantially linear edge portions, for guiding said stimulable phosphor sheet and supporting a surface of said sheet along said linear ege portions as said sheet is delivered into and out of said casing through said slot by said feeder means, wherein said line members comprise parallel spaced metal wires extending in the direction in which said stimulable phosphor sheet is delivered in said casing.

* * * * *